United States Patent
Chapman et al.

(10) Patent No.: US 7,150,466 B1
(45) Date of Patent: Dec. 19, 2006

(54) COLLAPSIBLE CARGO TRAILER AND METHOD OF DISTRIBUTION

(76) Inventors: Scott T. Chapman, 25954 Pierina Dr., Elkhart, IN (US) 46514; Kevin Francis Owens, 25954 Pierina Dr., Elkhart, IN (US) 46514

( * ) Notice: Subject to any disclaimer, the term of this patent is extended or adjusted under 35 U.S.C. 154(b) by 0 days.

(21) Appl. No.: 10/990,931

(22) Filed: Nov. 17, 2004

Related U.S. Application Data (60) Provisional application No. 60/544,631, filed on Feb. 13, 2004.

(51) Int. Cl.
*B62B 1/00* (2006.01)

(52) U.S. Cl. .................... 280/656; 280/639; 280/37

(58) Field of Classification Search ............... 280/656, 280/37, 639, 401, 30, 415.1, 491.2, 491.1, 280/789, 638, 63, 47.18
See application file for complete search history.

(56) References Cited

U.S. PATENT DOCUMENTS

| | | | | |
|---|---|---|---|---|
| 2,720,413 | A * | 10/1955 | Halverson | 296/10 |
| 4,362,316 | A * | 12/1982 | Wright | 280/656 |
| 4,746,142 | A * | 5/1988 | Davis | 280/656 |
| 4,758,008 | A * | 7/1988 | Moddejonge | 280/37 |
| 5,249,821 | A * | 10/1993 | Ricketts et al. | 280/638 |
| 6,378,893 | B1 * | 4/2002 | Jager | 280/656 |
| 6,511,092 | B1 * | 1/2003 | Chepa | 280/656 |
| 6,834,882 | B1 * | 12/2004 | Boyd | 280/656 |
| 6,962,370 | B1 * | 11/2005 | Simpson | 280/789 |
| 2003/0218316 | A1 * | 11/2003 | Simpson | 280/656 |
| 2003/0222431 | A1 * | 12/2003 | Crosby et al. | 280/656 |
| 2005/0093273 | A1 * | 5/2005 | McDonell | 280/656 |
| 2005/0184485 | A1 * | 8/2005 | Timmermans | 280/656 |

* cited by examiner

*Primary Examiner*—J. Allen Shriver
(74) *Attorney, Agent, or Firm*—Botkin & Hall, LLP (57) ABSTRACT

A cargo trailer having a frame assembly with pivotally mounted wall structures or frames. The frame assembly can be collapsed into a compact shipping configuration wherein the wall structures are positioned substantially parallel with the floor structure of the trailer. Various parts of the cargo trailer can also be stowed in the collapsed frame assembly for shipment of the frame assembly and stored parts. After shipment of the cargo trailer, the wall structures are pivoted into their upright positions and the final assembly of the cargo trailer is completed. Exterior panels may be shipped together in a compact stack with the frame to the final assembly location where the panels are attached to the cargo trailer.

21 Claims, 8 Drawing Sheets

FIG 8A

COLLAPSIBLE CARGO TRAILER AND METHOD OF DISTRIBUTION

CROSS-REFERENCE TO RELATED APPLICATION

This is a continuation of and claims the benefit of Provisional Application 60/544,631 filed Feb. 13, 2004.

BACKGROUND OF THE INVENTION

1. Field of the Invention

The present invention relates to cargo trailers and, more particularly, to a cargo trailer having a structure which is adapted for efficient shipping of the trailer.

2. Description of the Related Art

A variety of cargo trailers are known in the art. Commercially available cargo trailers include cargo trailers having one or two axles which support a generally rectilinear enclosure with a tongue extending from one end. A hitch is located on the end of the tongue and is engageable with a ball located on a tow vehicle such as a pick-up truck or automobile. The cargo trailer also typically includes at least one door that controls access to the interior of the cargo trailer. The potential uses of such cargo trailers are innumerable and such trailers are often used by small businesses. For example, construction contractors and landscapers often use such cargo trailer to transport equipment and materials between job sites.

Although known cargo trailers are effective for their intended purposes, the process used to manufacture and distribute such trailers is not without inefficiencies. For example, after completing the manufacture of the trailer, the trailer must be transported from the manufacturing location to a dealer location where the trailer is sold to the end user. The transporting of the assembled trailers to the dealer location must be accomplished by either towing individual trailers or otherwise transporting a small number of trailers.

The transport of the completed trailers between the manufacturing location and the dealer location is a source of significant expense in the ultimate cost of the trailer and a reduction in this expense is desirable.

SUMMARY OF THE INVENTION

The present invention provides a cargo trailer that has a frame which can be collapsed so that several frames can be stacked for shipment from the location of manufacture to the location of sale. The assembly of the cargo trailer is easily completed at the shipping destination point. By shipping the cargo trailers in a partially assembled and collapsed condition, the cargo trailers can be more efficiently shipped and shipping costs reduced.

The invention comprises, in one form thereof, a cargo trailer that includes a frame assembly having a substantially planar floor structure with a substantially rectangular configuration defining two lateral edges and two longitudinal side edges. The frame assembly also includes an end frame pivotally secured to the floor structure proximate one of the lateral edges and first and second side frames. Each of the side frames are pivotally secured to the floor structure proximate a respective one of the longitudinal side edges. The frame assembly has a shipping configuration and an assembled configuration wherein, when the frame assembly is in the shipping configuration, the end frame, the first side frame and the second side frame are all disposed proximate and substantially parallel to the floor structure. When the frame assembly is in its assembled configuration, the end frame, the first side frame and the second side frame are all disposed substantially perpendicular to the floor structure and define an enclosed cargo space above the floor structure. The cargo trailer further includes an axle assembly attachable to the frame assembly when the frame assembly is in the assembled configuration, a hitch structure attachable to the frame assembly when the frame assembly is in the assembled configuration, and a plurality of panel members which are attachable to the end frame, the first side frame and the second side frame.

The invention comprises, in another form thereof, a cargo trailer kit. The cargo trailer kit includes a frame assembly having a substantially planar floor structure with a substantially rectangular configuration defining two lateral edges and two longitudinal side edges and a plurality of wall structures pivotally secured to the floor structure proximate a respective one of the edges. The frame assembly has a shipping configuration and an assembled configuration. When the frame assembly is in the shipping configuration, the plurality of wall structures are all disposed proximate and substantially parallel to the floor structure. The frame assembly defines two opposed and cooperating stacking surfaces when in the shipping configuration whereby the frame assembly is stackable upon on a similar frame assembly. When the frame assembly is in the assembled configuration, the plurality of wall structures are all disposed substantially perpendicular to said floor structure to define an enclosed cargo space above the floor structure. The cargo trailer kit further includes an axle assembly and a hitch structure both of which are attachable to the frame assembly when the frame assembly is in the assembled configuration.

The invention comprises, in yet another form thereof, a method of distributing a cargo trailer. The method includes pivotally attaching a plurality of frames to a floor structure to thereby provide a frame assembly, placing the frame assembly in a shipping configuration at a first location wherein the plurality of frames are disposed proximate and substantially parallel to the floor structure, shipping the frame assembly from the first location to a second location with the frame assembly in the shipping configuration and completing assembly of the cargo trailer at the second location including pivoting the plurality of frames into an upright position substantially perpendicular to the floor structure and securing the frames in the upright position.

An advantage of the present invention is that it provides a cargo trailer that can be collapsed into a stackable and space-saving configuration for shipment from a manufacturing location to an assembly location positioned near the ultimate distribution point of the trailer. This reduces the space required for each trailer and allows the trailers to be stacked and shipped together and, thus, can provide a significant reduction in shipping costs. Once at the second location, e.g., a cargo trailer dealership, the final assembly of the cargo trailer can be easily accomplished.

BRIEF DESCRIPTION OF THE DRAWINGS

The above mentioned and other features and objects of this invention, and the manner of attaining them, will become more apparent and the invention itself will be better understood by reference to the following description of the invention taken in conjunction with the accompanying drawings, wherein.

Corresponding reference characters indicate corresponding parts throughout the several views. Although the exemplification set out herein illustrates the invention in one form, the embodiment disclosed below is not intended to be exhaustive or to be construed as limiting the scope of the invention to the precise form disclosed.

DETAILED DESCRIPTION OF THE INVENTION

Figure 7:
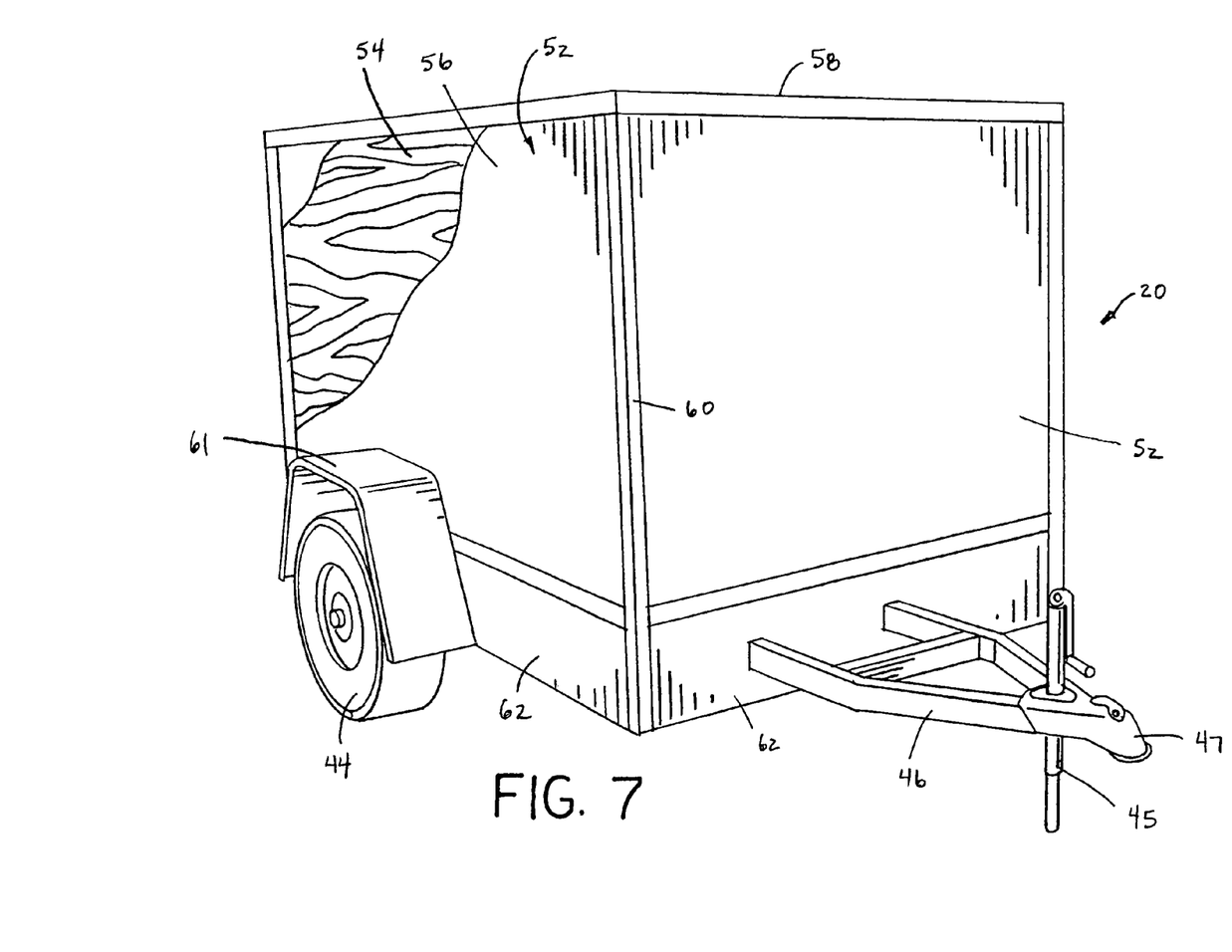
FIG. 7 is a partial cutaway view of an assembled cargo trailer in accordance with the present invention.

A cargo trailer 20 in accordance with the present invention is shown in FIG. 7. The cargo trailer includes a frame assembly 22 that can be collapsed to facilitate the shipping of cargo trailer 20 prior to the final assembly of cargo trailer 20.

Frame assembly 22 is best seen in FIGS. 1–5 and includes a floor structure 24, an end frame 26, a first side frame 28, and a second side frame 30. Each of these frames 26, 28 and 30, are wall structures that include a plurality of structural members 32, 33 secured together in an open framework. Outer perimeter members 32 are braced by members 33. Structural members 32 and bracing members 33 are elongate square or box tube steel members that are secured together by welding. Bolts or other suitable method may also be used to secure members 32 together to form frames 26, 28, 30.

Floor structure 24 has a frame defined by structural steel members 35. Axle brackets 36 and hitch reinforcement members 37 are secured to structural members 35. Plywood sheeting (not shown) is laid on top of frame members 35 to define the flat floor surface for the assembled cargo trailer 20. As seen in FIGS. 1–6, the illustrated floor structure 24 is substantially planar with a rectangular configuration having two lateral edges 38 and two longitudinal edges 40. Each of the frames 26, 28 and 30 are pivotally secured to floor structure 24 with hinges 34. The frames 26, 28 and 30 are pivotally secured at different heights to permit each of frames 26, 28, 30 to be pivoted downwards toward floor structure 24 to define a collapsed shipping configuration (FIG. 2) where each of the frames 26, 28, 30 are positioned substantially parallel to floor structure 24.

Figure 2:
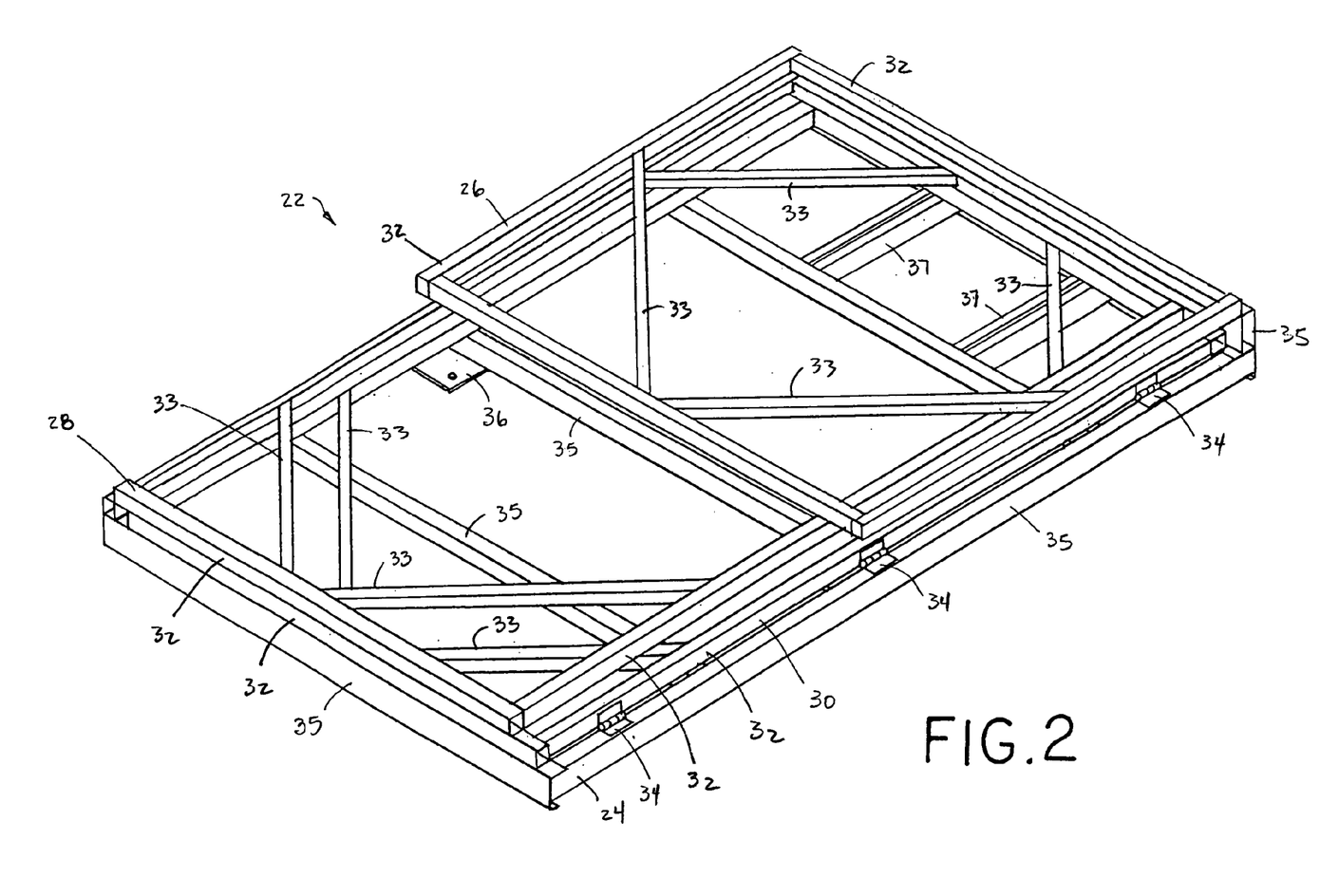
FIG. 2 is a view of the frame assembly of FIG. 1 prior to final assembly.

The pivot axes of frames 26, 28, 30 are vertically separated by a distance that is at least as great as the thickness of the frames to allow each of the frames to lie parallel to the floor structure 24 in the shipping configuration shown in FIG. 2. Steel structural members are attached and extend along the edges of floor structure 26 to provide mounting locations for hinges 34. These structural members have different sizes to position the pivot axes defined by hinges 34 at different vertical heights for each of the different frames 26, 28, 30.

In the illustrated embodiment, structural members 32 are larger than members 33 and each of the frames 26, 28, 30 is formed with perimeter members 32 having a common size. The vertical distance separating the pivot axes defined by hinges 34 of each of the frames 26, 28, 30 is substantially equivalent to this thickness of perimeter members 32 to allow frames 26, 28, 30 to lie on top of each other in the shipping configuration.

Figure 1:
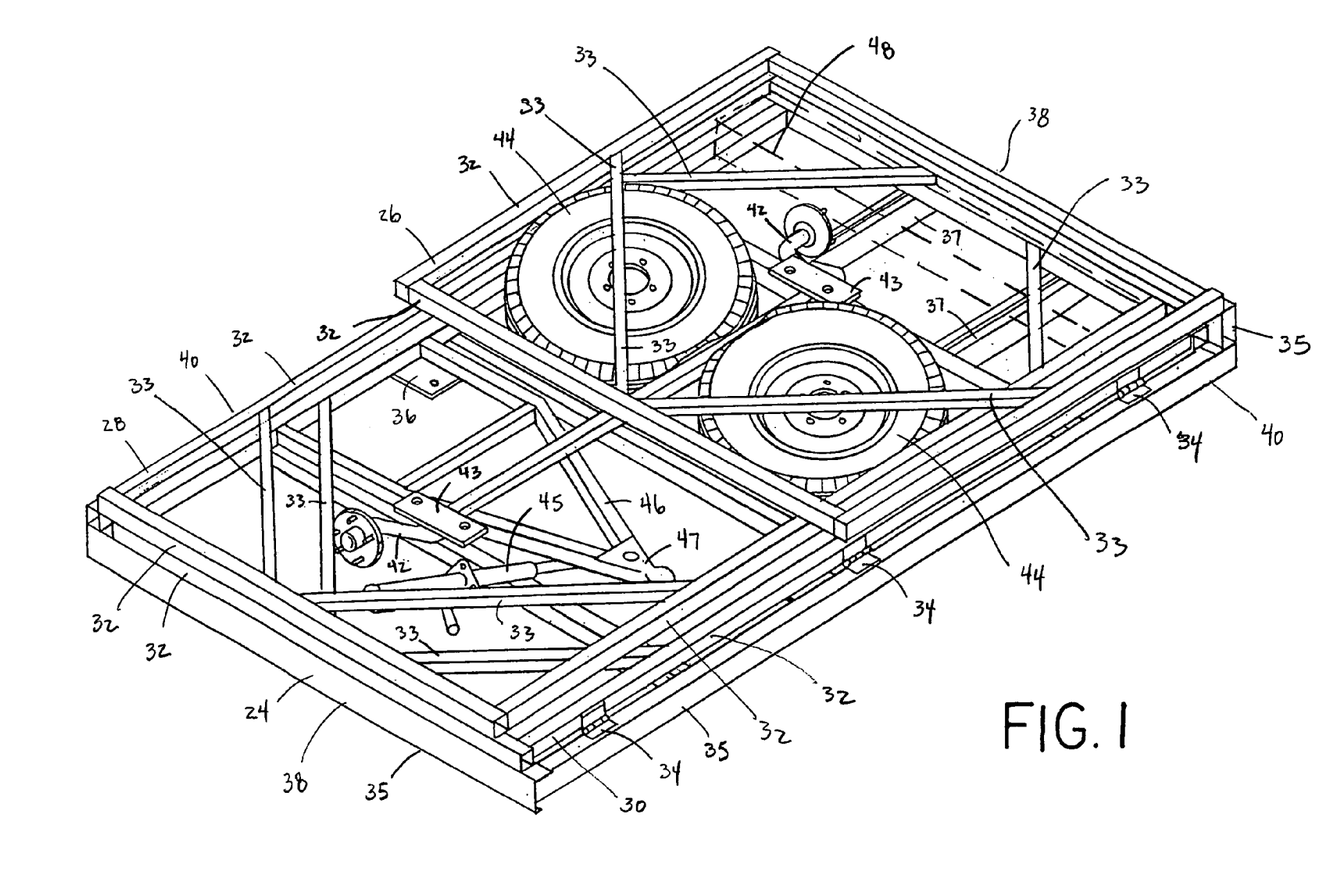
FIG. 1 is a view of a frame assembly in a shipping configuration in accordance with the present invention.

While FIG. 2 shows frame assembly 22 in its shipping configuration without any other parts, FIG. 1 illustrates frame assembly 22 in its shipping configuration with an axle assembly 42, wheels 44, and hitch structure 46 all stowed within the frame assembly 22. Dashed lines 48 generically represent additional cargo trailer components that can be stored within frame assembly 22 in its shipping configuration, such as roof beams 50. Strapping material, cardboard, or other suitable shipping and packaging materials are used to secure the stowed items within frame assembly 22 and secure frames 26, 28 and 30 in their shipping configuration positions. The plywood sheeting used to form the floor surface of cargo trailer 20 may also be installed on floor structure 24 prior to stowing items in frame assembly 22 so that the stowed items can rest on top of the plywood sheeting and thereby facilitate the securement of the stowed items beween the plywood sheeting and bracing members 33.

Figure 3:
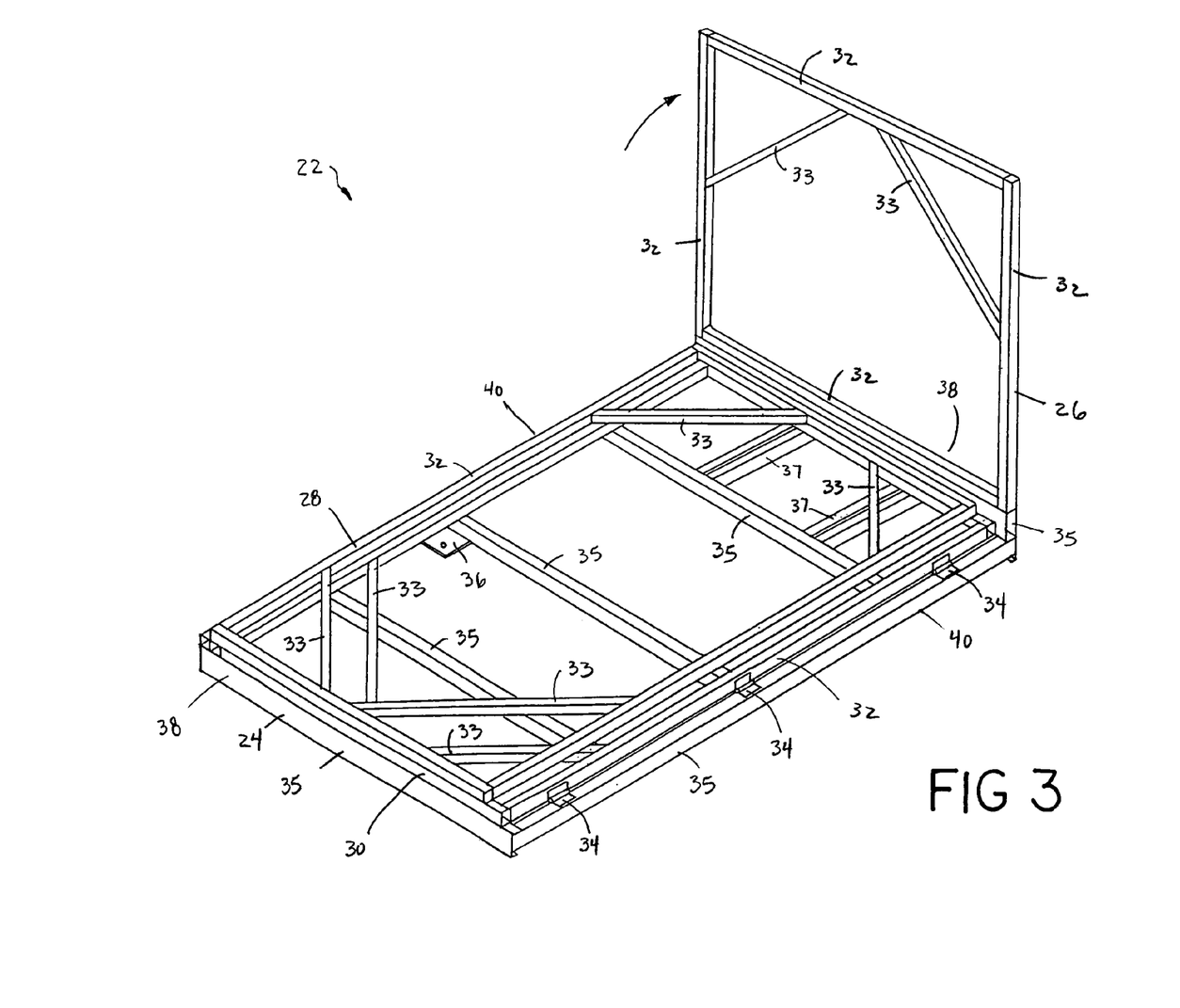
FIG. 3 is a view of the frame assembly of FIG. 1 during final assembly.
Figure 4:
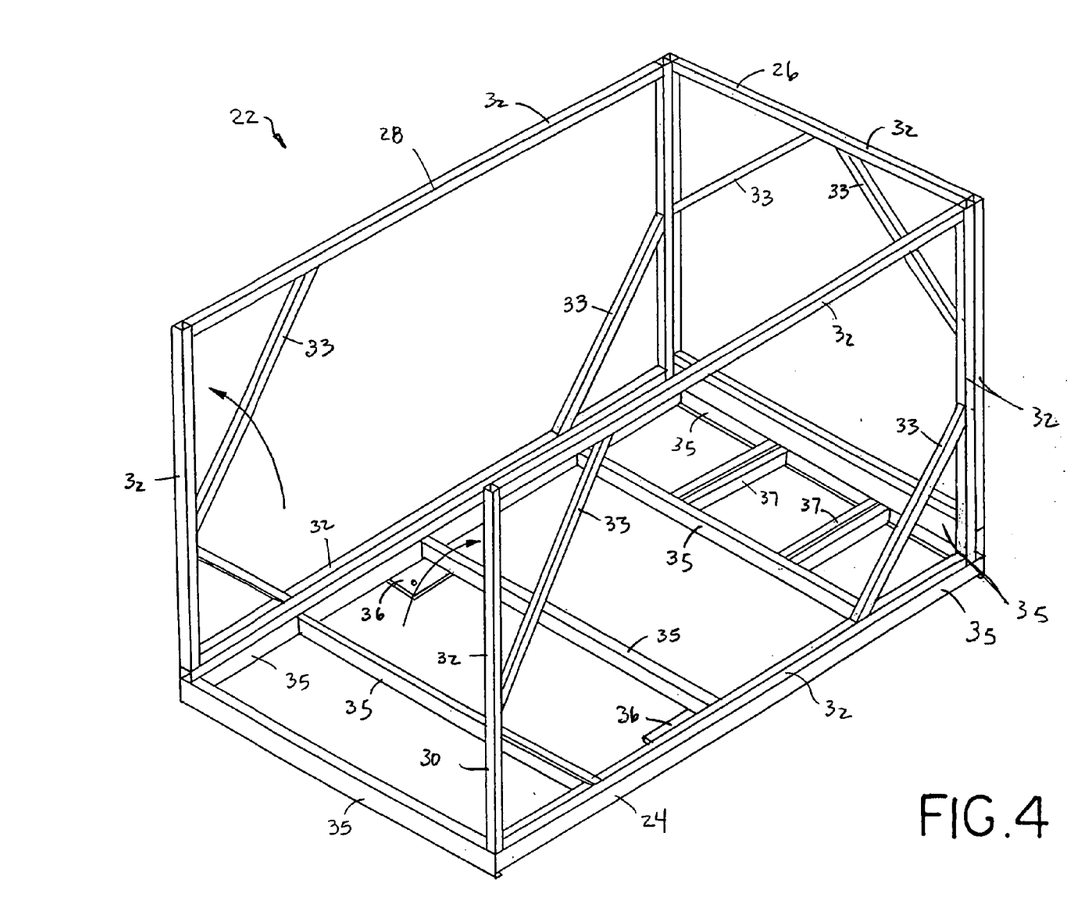
FIG. 4 is a view of the frame assembly of FIG. 1 during final assembly.
Figure 5:
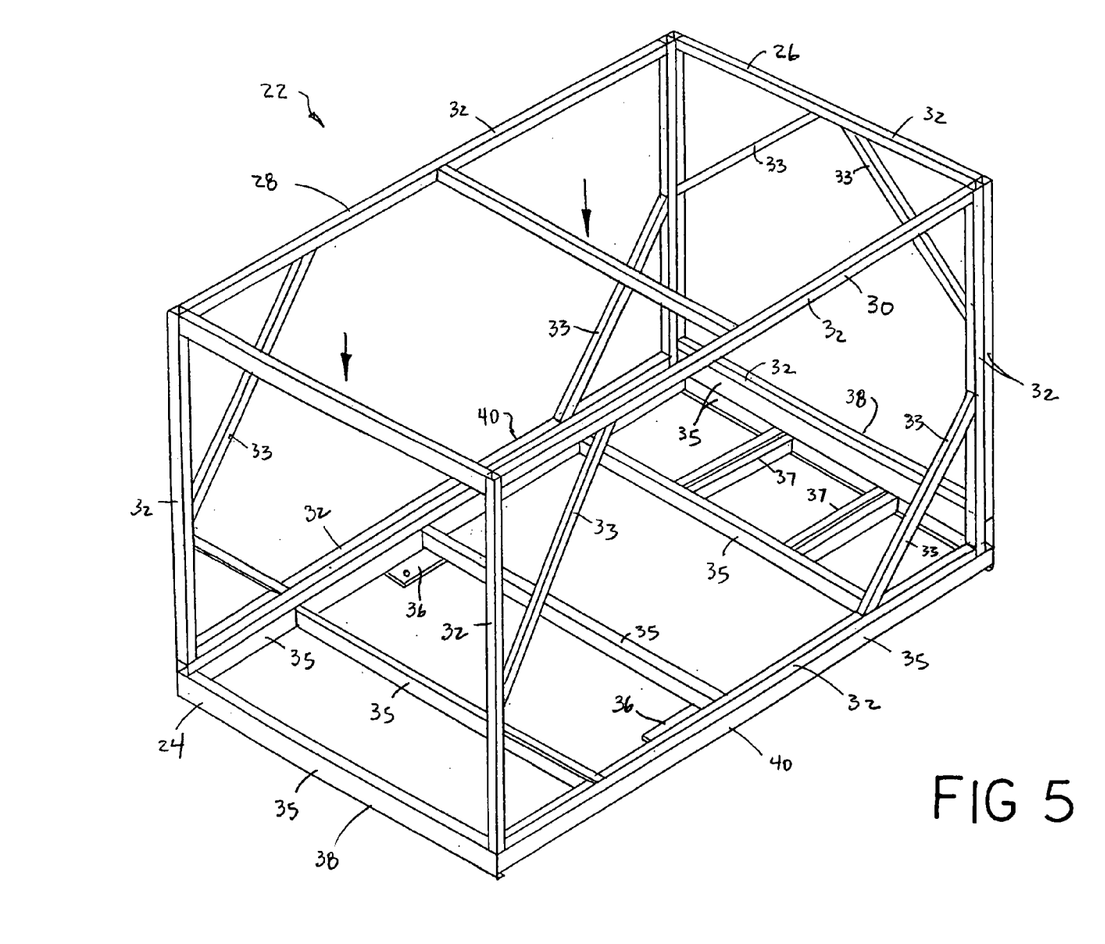
FIG. 5 is a view of the frame assembly of FIG. 1 during final assembly.

After the stowed items and frame assembly 22 have been secured in the shipping configuration (FIG. 1), the frame assembly 22 and stowed items can be easily shipped to another location for final assembly of cargo trailer 20. Additional parts of cargo trailer 20, such as exterior panel members, may be separately shipped to the assembly location. To assemble cargo trailer, the stowed items are first removed from frame assembly 22. End frame 26, which lies atop both side frames 28, 30 in the shipping configuration, is then pivoted into an upright position as seen in FIG. 3. Next, side frame 28 and then side frame 30 are pivoted into upright positions as shown in FIG. 4 so that all three frames 26, 28, 30 are positioned perpendicular to floor structure 24. Side frames 28, 30 are then each secured to end frame 26 with bolts or by welding. To provide further stability to the assembled cargo trailer frame, structural members 50 are attached to and extend between first and second side frames 28, 30 at their upper edges opposite floor structure 24 to thereby form roof beams as shown in FIG. 5.

Brackets 43 on axle assembly 42 are then secured to brackets 36 using bolts to secure axle assembly 42 to frame assembly 22. Axle assembly 42 utilizes a torsion bar suspension as is well known to those having ordinary skill in the art. Wheels 44 are then attached to axle assembly 42. In the illustrated embodiment, wheels 44 are shipped in a deflated condition to allow them to more easily fit within frame assembly 22 in its shipping configuration.

Figure 6:
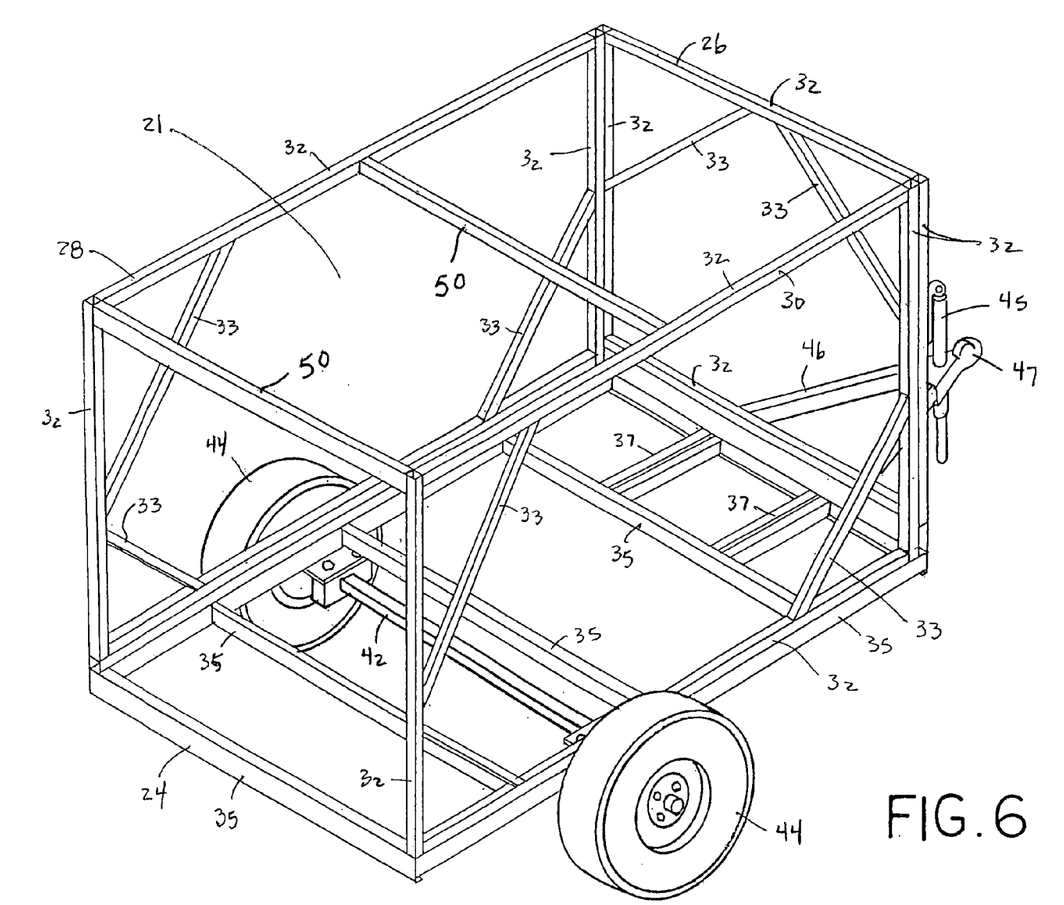
FIG. 6 is a view of the frame assembly of FIG. 1 with an axle and hitch attached thereto.

Tongue or hitch structure 46 is then secured to frame assembly 22 by welding or other suitable method. Members 37 reinforce frame assembly 22 at the location where hitch structure 46 is secured. Hitch structure 46 includes a conventional hitch 47 that mates with a ball located on a tow vehicle and a conventional manually operated stand 45 that supports cargo trailer in a level position when cargo trailer is not hitched to a vehicle. FIG. 6 illustrates frame assembly 22 in its assembled configuration after attachment of axle assembly 42 and hitch structure 46 to frame assembly 22 and prior to the attachment of the exterior panels.

Figure 8A:
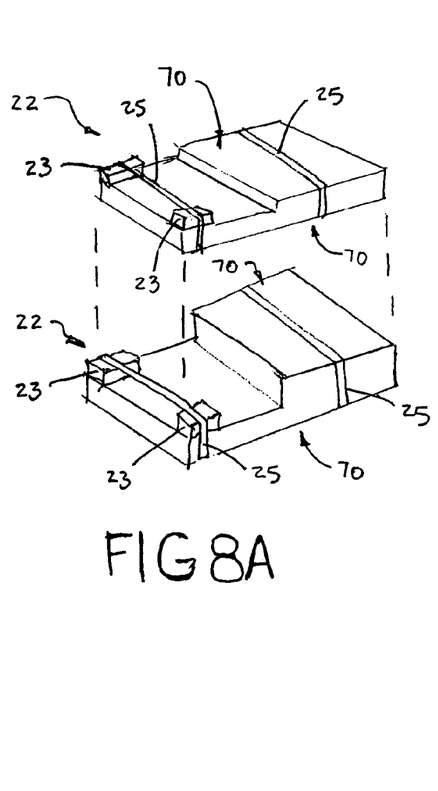
FIG. 8A is a schematic exploded view of two frame assemblies in a shipping configuration.
Figure 8B:
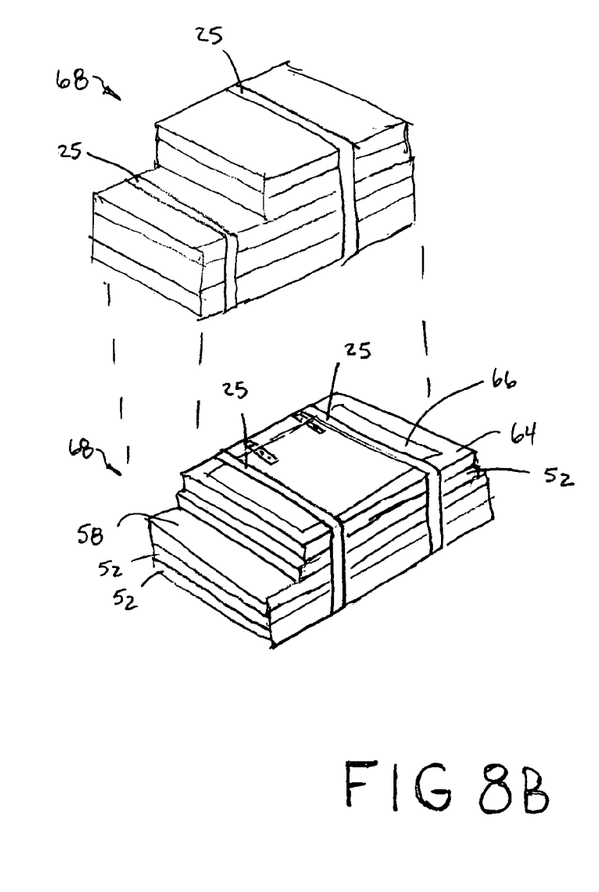
FIG. 8B is a schematic exploded view of two stacks of panels.

Separate panels 52 are attached to each of end frame 26 and side frames 28, 30. FIG. 7 illustrates one of the panels 52 in a partial cutaway view. As can be seen in FIG. 7, each of the panels 52 has a laminated structure that includes a ½ inch plywood substrate 54 and an exterior layer 56 of 0.003 inch aluminum sheeting. Alternative panel members having a different construction may also be employed with the present invention. Panels 52 are attached to frame members 32 with threaded fasteners or by other suitable means. A panel 58 having a construction similar to panels 52 is attached to structural members 50 and the upper edges of frames 26, 28, 30 to form a roof structure that closes the top of cargo space 21 defined by panels 52 and floor structure 24. Panels 52 and 58 not only enclose cargo space 21 but also enhance the structural rigidity of cargo trailer 20. The exterior panels also include a door panel 64 having a hinged door 66 that provides access to cargo space 21. When installed, door panel 64 extends along a lateral edge 38 of trailer 20 opposite end frame 26 to form the rear end of cargo trailer 20. Opposite ends of door panel 64 are attached to side frames 28, 30. A door panel 64 is schematically illustrated in FIG. 8B.

Additionally, aluminum corner molding 60 is attached at the joints between panels 52, 58, 64. The vertically extending moldings 60 extend below the lower end of panels 52 and also cover the corners of aluminum skirting 62 mounted to floor structure 24 below panels 52. Fender wells 61 are attached to panels 52 and floor structure 24 over wheels 44 as shown in the fully assembled cargo trailer 20 depicted in FIG. 7.

The ability to collapse frame assembly 22 into a compact shipping configuration allows several of the frame assemblies 22 to be stacked together when they are in their shipping configuration. A stack of panels 68 that contains each of the panels 52, 58, 64 necessary to complete the assembly of a cargo trailer 20 can also be secured together in a stack 68 for shipment. This allows for the efficient shipping of a kit of parts from a manufacturing and/or preliminary assembly location to a second location where the final assembly of cargo trailer 20 takes place. If desirable, the stack of panels 68 could be shipped to the final assembly location from a location that is different than the location from which frame assembly 22 is shipped.

Moreover, the compact nature of the frame assemblies 22 in their shipping configuration and of panel stacks 68 allows such frame assemblies 22 to be stacked together and for panel stacks 68 to be stacked together in a single truck trailer or shipping container. To facilitate the stacking of panel stacks 68 and frame assemblies 22 it may be necessary to wrap such assemblies in various packaging materials to protect the cargo trailer parts during shipment. It may also be necessary to use spacing objects to provide frame assemblies 22 with opposed and cooperating stacking surfaces 70 that provide for the level stacking of the frame assemblies 22. In the schematic illustration of FIG. 8A wooden blocks 23 are secured with strapping 25 to ensure the stability of the stacked assemblies 22. Similar spacing objects might be used with panel stacks 68. It would also be possible for a number of such collapsed trailers to be placed on a pallet and/or placed in a shipping container for the efficient overseas shipping of the trailers.

To take full advantage of the shipping efficiencies afforded by the present invention it will generally be desirable for the final assembly of the cargo trailers 20 to take place near the point of sale or final delivery of the cargo trailer. Thus, a single tractor-trailer could haul several cargo trailers 20 in their shipping configuration from a manufacturing site to a dealership or other retail sales location where the final assembly of cargo trailers takes place thereby significantly reducing the cost of shipping.

While this invention has been described as having an exemplary design, the present invention may be further modified within the spirit and scope of this disclosure. This application is therefore intended to cover any variations, uses, or adaptations of the invention using its general principles.

What is claimed is:

1. A cargo trailer comprising:
   a frame assembly including:
   a substantially planar floor structure having a substantially rectangular configuration defining two lateral edges and two longitudinal side edges;
   an end frame pivotally secured to said floor structure proximate one of said lateral edges;
   first and second side frames, each of said side frames being pivotally secured to said floor structure proximate a respective one of said longitudinal side edges;
   said frame assembly having a shipping configuration and an assembled configuration;
   wherein, when said frame assembly is in said shipping configuration, said end frame, said first side frame and said second side frame are all disposed proximate and substantially parallel to said floor structure; and
   wherein, when said frame assembly is in said assembled configuration, said end frame, said first side frame and said second side frame are all disposed substantially perpendicular to said floor structure to define an enclosed cargo space above said floor structure;
   and wherein said cargo trailer further includes:
   an axle assembly attachable to said frame assembly when said frame assembly is in said assembled configuration;
   a hitch structure attachable to said frame assembly when said frame assembly is in said assembled configuration; and
   a plurality of panel members, said panel members being attachable to said end frame, said first side frame and said second side frame.

2. The cargo trailer of claim 1 further comprising at least one structural member extending between said first side frame and said second side frame opposite said floor structure when said frame assembly is in said assembled configuration, said structural member being stowable within said frame assembly when said frame assembly is in said shipping configuration.

3. The cargo trailer of claim 1 wherein said end frame, said first side frame and said second side frame all vary from one another in height as measured when the fram assembly is in its assembled configuration and are all pivotally secured to said floor structure at different heights.

4. The cargo trailer of claim 3 wherein said end frame, said first side frame and said second side frame each define a frame thickness and said different heights are separated by vertical distances substantially equal to said frame thicknesses.

5. The cargo trailer of claim 1 further comprising a second one of said cargo trailers, said frame assemblies of said cargo trailers being stackable one upon the other when said frame assemblies are in said shipping configuration.

6. A cargo trailer comprising:
   a frame assembly including:
   a substantially planar floor structure having a substantially rectangular configuration defining two lateral edges and two longitudinal side edges;
   an end frame pivotally secured to said floor structure proximate one of said lateral edges;

first and second side frames, each of said side frames being pivotally secured to said floor structure proximate a respective one of said longitudinal side edges;

said frame assembly having a shipping configuration and an assembled configuration;

wherein, when said frame assembly is in said shipping configuration, said end frame, said first side frame and said second side frame are all disposed proximate and substantially parallel to said floor structure; and wherein, when said frame assembly is in said assembled configuration, said end frame, said first side frame and said second side frame are all disposed substantially perpendicular to said floor structure to define an enclosed cargo space above said floor structure;

and wherein said cargo trailer further includes:

an axle assembly attachable to said frame assembly when said frame assembly is in said assembled configuration;

a hitch structure attachable to said frame assembly when said frame assembly is in said assembled configuration; and a plurality of panel members, said panel members being attachable to said end frame, said first side frame and said second side frame; and a plurality of wheels attachable to said axle assembly and wherein said plurality of wheels and said axle assembly are stowable within said frame assembly when said frame assembly is in said shipping configuration.

7. The cargo trailer of claim 6 wherein said hitch structure is stowable within said frame assembly when said frame assembly is in said shipping configuration.

8. A cargo trailer comprising:

a frame assembly including:

a substantially planar floor structure having a substantially rectangular configuration defining two lateral edges and two longitudinal side edges;

an end frame pivotally secured to said floor structure proximate one of said lateral edges;

first and second side frames, each of said side frames being pivotally secured to said floor structure proximate a respective one of said longitudinal side edges;

said frame assembly having a shipping configuration and an assembled configuration;

wherein, when said frame assembly is in said shipping configuration, said end frame, said first side frame and said second side frame are all disposed proximate and substantially parallel to said floor structure; and wherein, when said frame assembly is in said assembled configuration, said end frame, said first side frame and said second side frame are all disposed substantially perpendicular to said floor structure to define an enclosed cargo space above said floor structure;

and wherein said cargo trailer further includes:

an axle assembly attachable to said frame assembly when said frame assembly is in said assembled configuration;

a hitch structure attachable to said frame assembly when said frame assembly is in said assembled configuration; and a plurality of panel members, said panel members being attachable to said end frame, said first side frame and said second side frame; and a roof structure and a door panel wherein, when said frame assembly is in said assembled configuration, said roof structure is attachable to upper edges of said end frame, said first side frame and said second side frame; and said door panel extends between said first and second side panels along a lateral edge of said floor structure opposite said end frame, said door panel including a hinged door controlling access to said cargo space.

9. A cargo trailer kit, said kit comprising:

a frame assembly including:

a substantially planar floor structure having a substantially rectangular configuration defining two lateral edges and two longitudinal side edges;

a plurality of wall structures pivotally secured to said floor structure proximate a respective one of said edges;

said frame assembly having a shipping configuration and an assembled configuration;

wherein, when said frame assembly is in said shipping configuration, said plurality of wall structures are all disposed proximate and substantially parallel to said floor structure, said frame assembly defining two opposed and cooperating stacking surfaces when in said shipping configuration whereby said frame assembly is stackable upon on a similar frame assembly;

wherein, when said frame assembly is in said assembled configuration, said plurality of wall structures are all disposed substantially perpendicular to said floor structure to define an enclosed cargo space above said floor structure;

and wherein said cargo trailer kit further includes:

an axle assembly attachable to said frame assembly when said frame assembly is in said assembled configuration; and a hitch structure attachable to said frame assembly when said frame assembly is in said assembled configuration.

10. The cargo trailer kit of claim 9 further comprising at least one structural member extending between two of said plurality of wall structures and disposed opposite said floor structure when said frame assembly is in said assembled configuration, said structural member being stowable within said frame assembly when said frame assembly is in said shipping configuration.

11. The cargo trailer kit of claim 9 wherein said plurality of wall structures are all pivotally secured to said floor structure at different heights.

12. The cargo trailer kit of claim 11 wherein said plurality of wall structures each define a thickness and said different heights are separated by vertical distances substantially equal to said thicknesses.

13. A cargo trailer kit, said kit comprising:

a frame assembly including:

a substantially planar floor structure having a substantially rectangular configuration defining two lateral edges and two longitudinal side edges;

a plurality of wall structures pivotally secured to said floor structure proximate a respective one of said edges;

said frame assembly having a shipping configuration and an assembled configuration;

wherein, when said frame assembly is in said shipping configuration, said plurality of wall structures are all disposed proximate and substantially parallel to said floor structure, said frame assembly defining two opposed and cooperating stacking surfaces when in said shipping configuration whereby said frame assembly is stackable upon on a similar frame assembly;

wherein, when said frame assembly is in said assembled configuration, said plurality of wall structures are all disposed substantially perpendicular to said floor structure to define an enclosed cargo space above said floor structure;

and wherein said cargo trailer kit further includes:

an axle assembly attachable to said frame assembly when said frame assembly is in said assembled configuration; and a hitch structure attachable to said frame assembly when said frame assembly is in said assembled configuration;

each of said plurality of wall structures comprises a plurality of structural members joined together to form an open framework.

14. The cargo trailer of claim 13 further comprising a plurality of panel members, said panel members being attachable to said plurality of wall structures.

15. The cargo trailer kit of claim 14 wherein said plurality of panels are securable together for shipment of said plurality of panels prior to attachment to said frame assembly.

16. The cargo trailer kit of claim 15 further comprising a roof structure and a door panel wherein, when said frame assembly is in said assembled configuration, said roof structure is attachable to upper edges of said plurality of wall structures; and said door panel extends between two of said wall structures along an edge of said floor structure, said door panel including a hinged door controlling access to said cargo space and wherein said roof structure and door panel are securable together with said plurality of panels for transport prior to attachment to said frame assembly.

17. The cargo trailer kit of claim 16 further comprising a second one of said cargo trailer kits, said frame assemblies of said cargo trailers being stacked one upon the other when said frame assemblies are in said shipping configuration.

18. A cargo trailer kit, said kit comprising:
a frame assembly including:
a substantially planar floor structure having a substantially rectangular configuration defining two lateral edges and two longitudinal side edges;
a plurality of wall structures pivotally secured to said floor structure proximate a respective one of said edges;
said frame assembly having a shipping configuration and an assembled configuration;
wherein, when said frame assembly is in said shipping configuration, said plurality of wall structures are all disposed proximate and substantially parallel to said floor structure, said frame assembly defining two opposed and cooperating stacking surfaces when in said shipping configuration whereby said frame assembly is stackable upon on a similar frame assembly;
wherein, when said frame assembly is in said assembled configuration, said plurality of wall structures are all disposed substantially perpendicular to said floor structure to define an enclosed cargo space above said floor structure;
and wherein said cargo trailer kit further includes:
an axle assembly attachable to said frame assembly when said frame assembly is in said assembled configuration; and
a hitch structure attachable to said frame assembly when said frame assembly is in said assembled configuration;
a plurality of wheels attachable to said axle assembly and wherein said plurality of wheels and said axle assembly are stowable within said frame assembly when said frame assembly is in said shipping configuration.

19. The cargo trailer kit of claim 18 wherein said hitch structure is stowable within said frame assembly when said frame assembly is in said shipping configuration.

20. A cargo trailer comprising:
a frame assembly including:
a substantially planar floor structure having a substantially rectangular configuration defining two lateral edges and two longitudinal side edges;
an end frame pivotally secured to said floor structure proximate one of said lateral edges;
first and second side frames, each of said side frames being pivotally secured to said floor structure proximate a respective one of said longitudinal side edges;
said frame assembly having a shipping configuration and an assembled configuration;
wherein, when said frame assembly is in said shipping configuration, said end frame, said first side frame and said second side frame are all disposed proximate and substantially parallel to said floor structure; and
wherein, when said frame assembly is in said assembled configuration, said end frame, said first side frame and said second side frame are all disposed substantially perpendicular to said floor structure to define an enclosed cargo space above said floor structure;
and wherein said cargo trailer further includes:
an axle assembly attachable to said frame assembly when said frame assembly is in said assembled configuration;
a hitch structure attachable to said frame assembly when said frame assembly is in said assembled configuration; and
a plurality of wheels attachable to said axle assembly and wherein said plurality of wheels and said axle assembly are stowable within said frame assembly when said frame assembly is in said shipping configuration.

21. The cargo trailer of claim 20 wherein said hitch structure is stowable within said frame assembly when said frame assembly is in said shipping configuration.

* * * * *

UNITED STATES PATENT AND TRADEMARK OFFICE
CERTIFICATE OF CORRECTION

PATENT NO. : 7,150,466 B1
APPLICATION NO. : 10/990931
DATED : December 19, 2006
INVENTOR(S) : Scott T. Chapman and Kevin Francis Owens

It is certified that error appears in the above-identified patent and that said Letters Patent is hereby corrected as shown below:

On the title page, item (76), following the name and address of inventor Kevin Francis Owens, insert -- Perry L. Stow, 2911 Northside Blvd., South Bend, IN (US) 46615;
Ronald E. Williams, 30400 CR 2, Granger, IN (US) 46530 --.

Signed and Sealed this

Thirteenth Day of May, 2008

JON W. DUDAS
*Director of the United States Patent and Trademark Office*